(12) United States Patent
Hunt

(10) Patent No.: US 7,224,740 B2
(45) Date of Patent: May 29, 2007

(54) LOW FREQUENCY BILATERAL COMMUNICATION OVER DISTRIBUTED POWER LINES

(75) Inventor: Paul C. Hunt, Pequot Lakes, MN (US)

(73) Assignee: Hunt Technologies, Inc., Pequot Lakes, MN (US)

( * ) Notice: Subject to any disclaimer, the term of this patent is extended or adjusted under 35 U.S.C. 154(b) by 0 days.

(21) Appl. No.: 11/068,496

(22) Filed: Feb. 28, 2005

(65) Prior Publication Data

US 2005/0231039 A1 Oct. 20, 2005

Related U.S. Application Data

(63) Continuation of application No. 10/649,061, filed on Aug. 27, 2003, now abandoned, which is a continuation of application No. 10/208,431, filed on Jul. 29, 2002, now abandoned, which is a continuation of application No. 09/723,090, filed on Nov. 27, 2000, now abandoned, which is a continuation of application No. 08/933,745, filed on Sep. 23, 1997, now Pat. No. 6,154,488.

(51) Int. Cl.
 *H04L 27/00* (2006.01)
 *H04B 1/38* (2006.01)

(52) U.S. Cl. ...................................... 375/259; 375/219

(58) Field of Classification Search ................ 375/219, 375/220, 259; 340/310.01, 313, 310.02, 340/870

See application file for complete search history.

(56) References Cited

U.S. PATENT DOCUMENTS

| | | | | |
|---|---|---|---|---|
| 4,396,915 A | * | 8/1983 | Farnsworth et al. | ... 340/870.03 |
| 5,559,377 A | * | 9/1996 | Abraham | ..................... 307/104 |
| 5,684,450 A | * | 11/1997 | Brown | ........................ 370/493 |
| 6,104,707 A | * | 8/2000 | Abraham | ..................... 370/295 |
| 6,154,488 A | * | 11/2000 | Hunt | .......................... 375/219 |

* cited by examiner

*Primary Examiner*—Emmanuel Bayard
*Assistant Examiner*—Lawrence Williams
(74) *Attorney, Agent, or Firm*—Merchant & Gould

(57) ABSTRACT

A system and method for providing full-duplex data communications between an electric power distribution station and a power consumer via the power distribution line providing electric power is provided. A first information transmitter, coupled to the power distribution circuit, provides first information signals concurrently with the power signal to the power consumer via the power distribution line. A first information receiver, coupled to a power consumer device powered by the electrical power signal, receives the first information signals via the electric power distribution line. A second information transmitter coupled to the power consumer device provides second information signals concurrently with the electrical power signal. A second information receiver, coupled to the power distribution circuit, receives the second information signals via the electric power distribution line. The information signals transmitted on the power distribution line can be transmitted at a frequency lower than the frequency of the transmitted power signal.

20 Claims, 7 Drawing Sheets

LOW FREQUENCY BILATERAL COMMUNICATION OVER DISTRIBUTED POWER LINES

RELATED APPLICATIONS

This application is a continuation of application Ser. No. 10/649,061, filed Aug. 27, 2003, now abandoned which is a continuation of application Ser. No. 10/208,431, filed Jul. 29, 2002, now abandoned which is a continuation of application Ser. No. 09/723,090, filed Nov. 27, 2000, now abandoned which is a continuation of application Ser. No. 08/933,745, filed Sep. 23, 1997, now U.S. Pat. No. 6,154,488, which applications are incorporated herein.

FIELD OF THE INVENTION

This invention relates generally to data communications, and more particularly to a system and method for providing full-duplex data communications between an electric power distribution station and a power consumer, via the same power distribution line that provides electric power to the power consumer, at frequencies at or below the frequency of the electric power signal.

BACKGROUND OF THE INVENTION

As is true with most companies, utility companies are striving to reduce overhead costs, while providing more convenience to customers. For example, electric companies are migrating from costly and time-consuming manual methods of determining the amount of power consumed by customers of the power company. Traditionally, a person periodically came to the customer's home, and requested entry to read the consumer power usage from a power meter. This type of process was costly, slow, and intrusive to their customers. In order to alleviate some of the problems associated with the traditional approach, other approaches have been employed, including wireless and modem transmission of power usage amount.

However, it is often the case that there is information that the power company may want to provide to their customers. While general information, such as the current price of power, price increases, etc. may be made available to customers via mail or telephone, it is again costly, time consuming, and intrusive.

Furthermore, many power companies provide customers with cost discounts if the customer agrees to allow the power company to temporarily adjust or terminate their power consumption for certain "non-essential" power-consuming devices (e.g., air conditioners, water heaters, swimming pool heaters, etc.) during peak operation. This is commonly referred to as "load control" or "load limiting". This allows the power company to limit the peak power consumption when necessary. Otherwise, the power company may have to purchase more expensive power from alternative sources to meet its peak load demand. A one-way wireless pager technology could be used to service the peak load in this manner. For example, a power company could send a digital message via one-way pager technology to a particular geographic area including a number of customers who have agreed to allow the power company to alter their power during peak power periods. The pager at the destination would receive a digital word indicating that the power should be temporarily terminated. Because the communication would be unilateral, no signal acknowledge would be provided, and there would be no manner, short of a trial-and-error method, to determine whether the customer's power to these appliances was ever suspended. Furthermore, customers could also tamper with the pager systems to avoid having their power temporarily terminated, while continuing to obtain the cost discount.

Therefore, it would be desirable to allow information to be provided from the power company to any one or more of their power consumers, while allowing for receipt acknowledgment and other signals. It would also be desirable to utilize power distribution line to provide such information, in order to avoid new wiring and its associated costs and installation time requirements. Utilizing the existing power distribution line would also minimize customer tampering during load control periods, as tampering with or severing the control line would be tantamount to eliminating their own source of power because the power is transmitted on the same conductor. The use of frequencies having a very long wavelength would also be desirable, to minimize the need for signal repeaters, and to minimize harmonic effects and reduce the overall noise on the power line which can adversely affect electronic devices such as computers.

While the prior art does not provide the aforementioned functionality, the present invention provides a solution to these and other shortcomings of the prior art, and further provides additional advantages over the prior art.

SUMMARY OF THE INVENTION

Generally, the present invention relates to a system and method for providing full-duplex data communications between an electric power distribution station and a power consumer via the same power distribution line that provides electric power to the power consumer.

In accordance with one embodiment of the invention, a full-duplex communications system for transmitting information is provided. A power distribution circuit is coupled to an electric power distribution line to transmit an electrical power signal to a power consumer. A first information transmitter, which is coupled to the power distribution circuit, provides first information signals concurrently with the electrical power signal to the power consumer via the electric power distribution line. A first information receiver, coupled to a power consumer device powered by the electrical power signal, receives the first information signals via the electric power distribution line. A second information transmitter coupled to the power consumer device provides second information signals concurrently with the electrical power signal via the electric power distribution line. A second information receiver, coupled to the power distribution circuit, receives the second information signals via the electric power distribution line. This configuration allows for full-duplex communication between the power distribution circuit and the power consumer via the electric power distribution line.

In accordance with another embodiment of the invention, a full-duplex communications system for disseminating information from a power distribution station to a plurality of power consumer sites via the electric power distribution line providing power to the plurality of power consumer sites is provided. An information transmitter at the power distribution circuit provides information signals via the power distribution line to the plurality of power consumer sites while also providing the power consumer sites with electric power. Each of the power consumer sites includes at least one information receiver which is coupled to a power consuming device which also receives the information signals. Each consumer site also includes a consumer information transmitter to provide consumer information to the power distribution station via the power distribution line, which is received at the power distribution circuit by a consumer information receiver. This configuration provides for fill-duplex communication between a utility power source and each of the power consumer sites, without the need for additional wiring.

In accordance with yet another embodiment of the invention, a communications system for transmitting information from a utility power distribution node to a power consumer via an electric power distribution line is provided. A transmitting circuit at the power distribution node transmits an information signal via the power distribution line at a frequency less than the frequency at which the power is transmitted on the power distribution line. This low frequency signal is received by a receiving circuit at a customer site via the power distribution line. In one embodiment of the invention, a low frequency modulating circuit superimposes the information signal onto the electric power signal which provides power to the consumer.

In accordance with another embodiment of the invention, a signal transmission device transmits information signals from a utility power distribution node to a power consumer via a power distribution line. The signal transmission device includes an information signal modulating circuit to superimpose an information signal on the power signal. The frequency of the information signal generated has a frequency less than the frequency of the power signal. The modulating circuit includes a zero-crossover sense circuit to determine the approximate zero-crossover points of the power signal. A signal inversion circuit inverts the phase of every nth half-period of the power-signal between successive zero-crossover points. By altering the phases of the power signal, the control signal can be superimposed onto it, wherein consecutive positive phases of the altered power signal correspond to a first logic state (e.g., a "high" logic level) of the information signal, and consecutive negative phases of the altered power signal correspond to a second logic state (e.g., a "low" logic level) of the information signal. Signal driving circuitry concurrently drives the altered power signal, and the electric power, to the power consumer via the power distribution line.

In accordance with another aspect of the invention, a communication method for communicating between an electric power provider and an electric power consumer via an electric power distribution line is provided. A power signal is provided to the power consumer via the electric power distribution line at a predetermined power signal frequency. A control signal, corresponding to the control information, is concurrently transmitted to the power consumer via the electric power distribution line. The control signal is transmitted at a frequency less than the frequency of the power signal. The control information can be used to manipulate the operation of the consumer devices at the power consumer site.

The above summary of the present invention is not intended to describe each illustrated embodiment or every implementation of the present invention. The figures and the detailed description which follow more particularly exemplify these embodiments.

DETAILED DESCRIPTION OF THE ILLUSTRATED EMBODIMENTS

Figure 1:
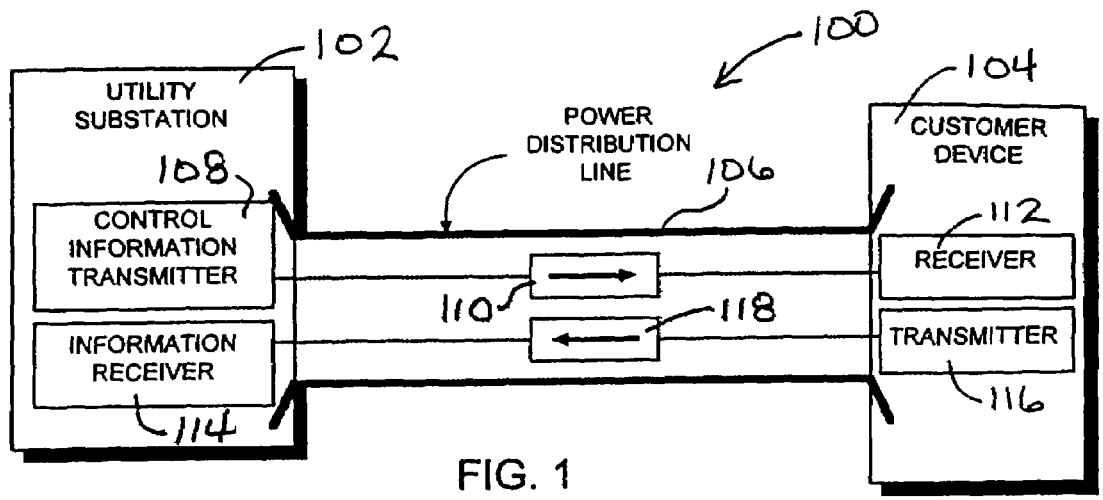
FIG. 1 is a block diagram of one link of an electric distribution system distributing power between a utility substation and a customer device at the power consumer's site.

FIG. 1 is a block diagram of one link of an electric distribution system 100 distributing power between a utility substation and a customer device at the power consumer's site. An electric distribution system, or distribution plant as it is sometimes referred to, is all of that part of an electric power system between the bulk power source or sources and the consumer service switches. The bulk power sources are located in or near the load area to be served by the distribution system, and may be either generating stations or power substations supplied over transmission lines. Subtransmission circuits extend from the bulk power source or sources to the various distribution substations located in the load area The subtransmission circuits typically consist of underground cable, aerial cable, or overhead open-wire conductors carried on poles, or some combination of them.

Each distribution substation normally serves its own load area, which is a subdivision of the area served by the distribution system. At the distribution substation the subtransmission voltage is reduced for general distribution throughout the area. The substations consists of one or more power-transformer banks together with the necessary voltage regulating equipment, buses, and switchgear. Distribution transformers are ordinarily connected to the distribution transformer, which serve to step-down from the distribution voltage to the utilization voltage. These step-down transformers, often referred to as pole transformers, supply a consumer or group of consumers over a secondary circuit. Each consumer is connected to the secondary circuit through its service leads and meter.

The utility substation 102 shown in FIG. 1 represents any power distribution point in an electric distribution system. Therefore, in a small distribution system, the utility substation 102 may represent the originating bulk power source, or may represent a distribution substation further down the distribution chain. The utility substation 102 provides power to a customer device 104 at a power consumer site via a power distribution line 106. The power distribution line 106 may be coupled to one or more step-down transformers prior to reaching the customer site. The power distribution line provides the power necessary to operate electrical devices, such as the customer device 104, at the customer site.

For a variety of reasons, it may be desirable to communicate information from the utility substation 102 to one or more customer devices 104 at a particular customer site. For example, it may be desirable to control or monitor a meter reading device, which is installed at a customer site to determine the power consumption at that customer site. Control information could provide the ability to control or alter the operation of the meter reading device. Furthermore, utility companies often provide a customer with a power rate discount if the customer agrees to allow for a temporary adjustment of their consumption. For example, a power company may provide a customer with a rate discount where the customer agrees to allow the power company to temporarily adjust or terminate their power consumption for certain nonessential power consuming devices, such as water heaters, swimming pool heaters, air conditioners, etc. during peak operation. This allows the utility company to limit the peak power consumption when necessary, hereinafter referred to as "load control".

Other more general information, which is not necessarily to "control" customer devices, can also be provided via the power distribution lines. These general information signals are transmitted in the same manner as signals intended to control a customer device. Such general information signals include information to display or store the price of power at the customer site, the date and time, the temperature or other information capable of being received and translated at the customer site. For example, the time displayed on an electronic device at the customer site could be periodically adjusted to display an accurate time as transmitted by the utility station.

The present invention therefore allows control signals and general information signals to be sent to the particular customer device via the power distribution line 106 to control customer devices and provide more general information to the customer. Information from the customer device may also be sent via the power distribution line to the utility substation 102, thereby creating a two-way control information communication link via the power distribution line 106. The aforementioned examples of control signal applications where control signals (and/or general information signals) are provided by the utility substation to a customer site are merely representative of the various uses that such control signals provide. Therefore, the examples provided throughout the application are illustrative in nature, as the invention is not limited to any particular control signal use.

In order to provide control information at the utility substation 102, a transmitter 108 is used to drive the control signals along the power distribution line 106 in the direction represented by the arrow 110. A receiver 112 at the customer device is configured to recognize the control signals transmitted by the control information transmitter 108. Similarly, the utility substation 102 may be equipped with an information receiver 114 to receive information, such as a power consumption reading, from a transmitter 116 at the customer device 104 in the direction represented by arrow 118.

The control information communications link 100 shown in FIG. 1 therefore provides a full-duplex communications link between the utility substation 102 and the customer site. Full-duplex in this sense refers to simultaneous communications in both directions, although the information sent in one direction may travel at a speed different than that of the information provided in the opposite direction. This full-duplex communication link via the power distribution line 106 provides for reliable transmission of control information, without the need for additional wiring, thereby minimizing cost and increasing data integrity.

The full-duplex communication link 100 is designed for the transfer of control information at a frequency at or below the frequency at which the power is being distributed on the power distribution line 106. Such low frequency control signals provides for longer transmission links, and there is little chance that the data will interfere with the electrical power transmission. Furthermore, a low frequency signal can pass through downstream transformers and capacitors with minimal signal degradation, and without the aid of additional equipment such as repeaters.

Data analyzation using low frequency control signals over a period of time can provide a great deal of valuable information. For example, in load control situations where a power consumer has agreed to have nonessential power consuming devices regulated by the power company, each request by the power company to adjust or temporarily terminate the power to the consumer can be stored and compared to an acknowledgment received at a later time. If it is determined that power consumption at the customer site decreased over a period of time and/or over a number of occurrences of request/acknowledgment events, the power adjusting or terminating request was likely successful. On the other hand, if the peak power consumption did not decrease during these times, an equipment failure may have occurred, or the customer may have tampered with the control signal receiver at the customer device 104. Statistical information gathered over time can protect the utility companies from providing a discount to a power consumer where it is unwarranted.

Figure 2:
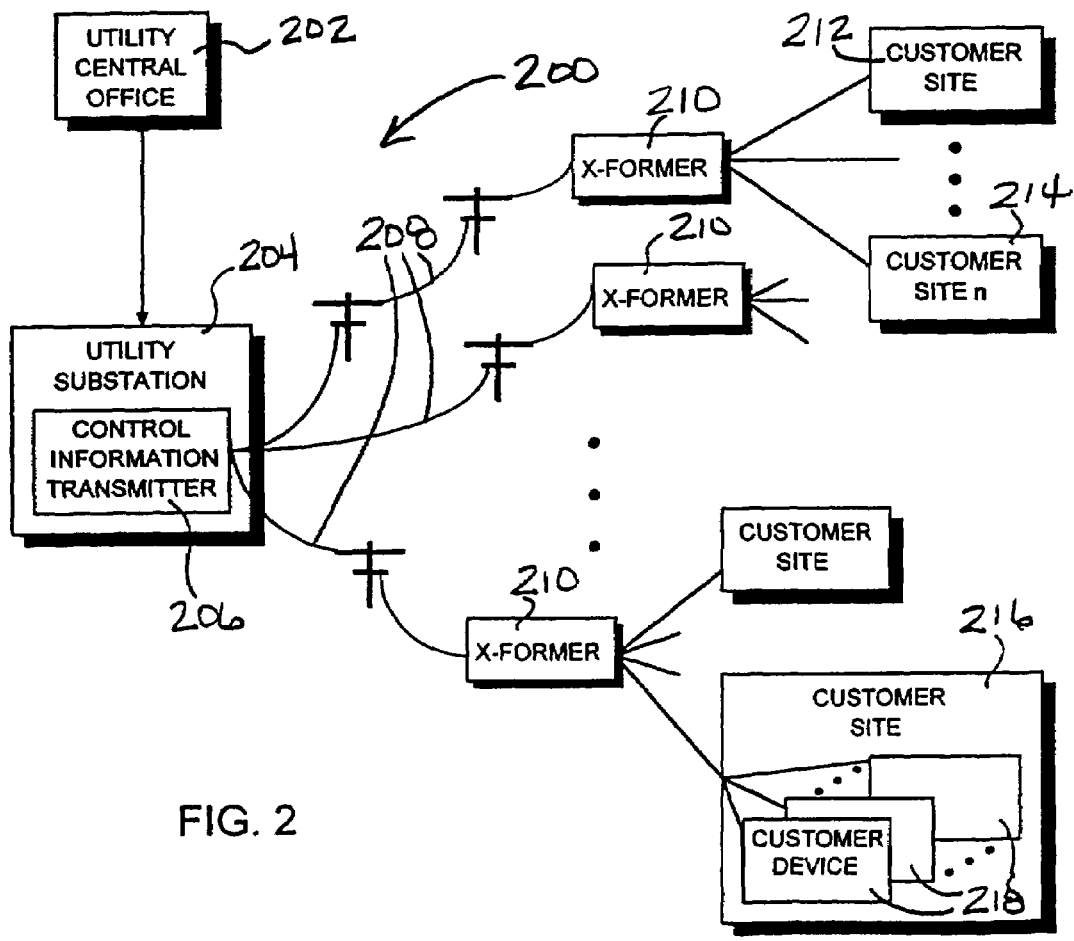
FIG. 2 is a block diagram of a power distribution system implementing an information transmitter in accordance with the present invention.

Referring now to FIG. 2, a block diagram of a power distribution system 200 implementing an information transmitter in accordance with the present invention is provided. A utility central office 202 provides the bulk power, and a transmit control signal, to the utility substation 204 including the control information transmitter 206. As can be seen by the example of FIG. 2, the control information transmitter can simultaneously transmit control information via the power distribution lines 208 to multiple customer devices residing in multiple customer sites. The control information can pass through transformers 210, and ultimately to a particular customer site 212. A plurality of customer sites may be serviced by a particular transformer 210, as illustrated by customer site n 214. Furthermore, a customer site such as site 216 may include a plurality of different customer devices 218. The transfer of control information from a utility substation information transmitter 206 to a great number of customer sites is very useful, yet cost effective.

Figure 3:
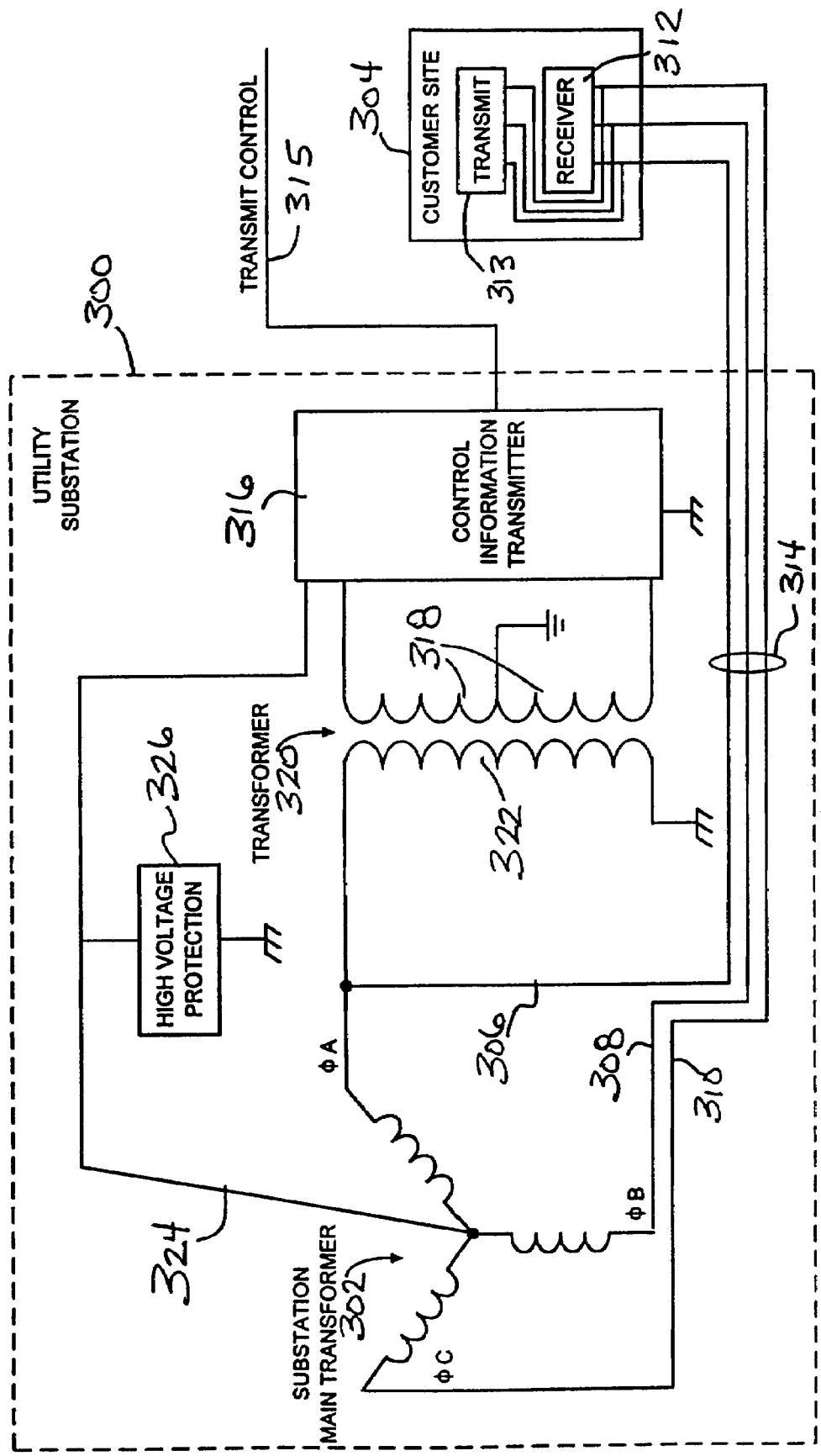
FIG. 3 is block diagram illustrating one embodiment of the connection of the power generation and control information transmitter at the utility substation.

FIG. 3 is block diagram illustrating one embodiment of the connection of the power generation and control information transmitter at the utility substation 300. The substation 300 typically includes a main transformer 302 which provides 3-phase power to the customer site 304. Phases A, B and C on lines 306, 308 and 310 respectfully are transmitted to the receiver 312 at the customer site 304. In order to induce the control information onto the three phases 306, 308 and 310 of the power distribution line 314, the control information transmitter 316 generates a voltage on the secondary windings 318 of the transformer 320 onto the primary windings 322 according to the transformer 320 turns ratio. The customer site 304 is equipped with receivers 312 at the customer devices so that the control information can be extracted from the power signal. In one embodiment of the present invention, the receiver is a digital signal processing (DSP) device requiring no analog components. DSP technology used to extract such a control signal is readily available to those skilled in the art. The customer site 304 also includes transmit circuitry 313, which allows information, such as power consumption usage measured by a meter, to be sent back to the utility substation 300 via the power distribution line 314.

Transmit control circuitry at the utility central office is used to provide a bitstream of binary data, shown as the transmit control signal on line 315, to assist in modulating the control signal at the control information transmitter 316. The transmit control circuitry at the utility central office may include a modem connection to a remote site in order to receive the actual information which is to be converted into the control signal. The transmit control signal is a bitstream which corresponds to the actual information to be converted into the control signal. For example, the bitstream can include binary indications of the modulation points in a frequency modulated system, so that a binary "1" corresponds to a first frequency, and a binary "0" corresponds to a second frequency in the frequency modulated system. The transmit control signal is described in further detail in connection with FIG. 9.

The control information transmitter 316 is coupled in series with the neutral line 324 of the main transformer 302. Therefore, the control signal voltage generated by the control information transmitter 316 causes the voltage on the neutral line to correspond to the control signal generated. The control signal is also applied to the three phases of the power distribution line 314. Therefore, while the voltage on each of the phases of the power distribution line 314 may go to a higher voltage than where only the power signal were present on the line, the voltage on the neutral line 324 is similarly modulated such that the voltage at each of the phases does not change with respect to the voltage on the neutral line 324.

Because the control information transmitter 316 is coupled in series with the neutral line 324, an open-circuited condition in the control information transmitter 316 could result in an excessively large voltage being present at the customer site 304. In order to address this situation, at least one high voltage protection unit 326 is coupled between the neutral line 324 and earth ground. Other voltage protection also resides in the control information transmitter 316. These protection modules, as well as the high voltage protection circuit 326, will be described in greater detail in connection with the descriptions corresponding to FIGS. 4 and 10.

Figure 4:
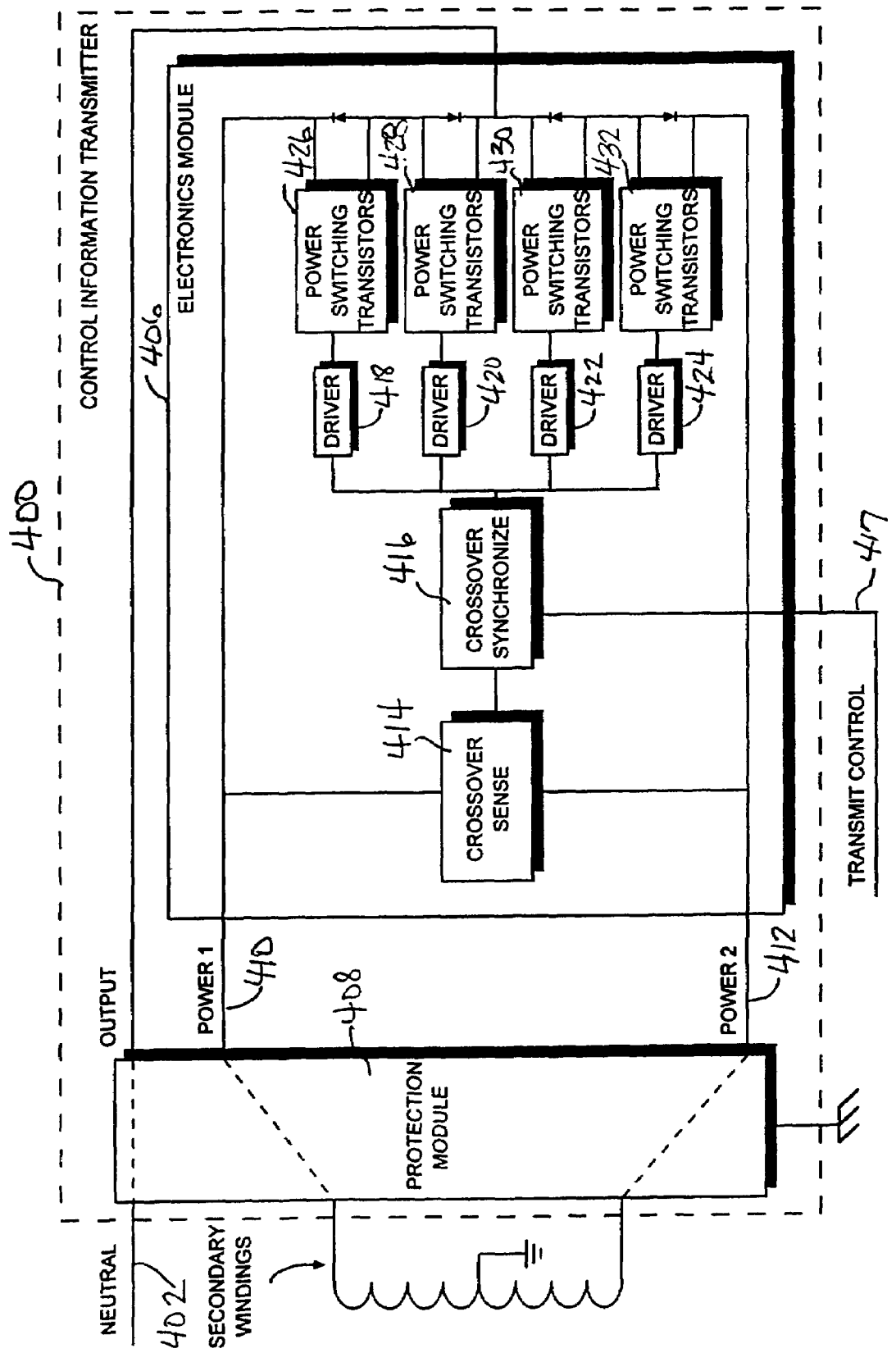
FIG. 4 is a block diagram of one embodiment of a control information transmitter in accordance with the present invention.

Referring now to FIG. 4, a block diagram is provided of one embodiment of a control information transmitter 400 in accordance with the present invention. The control information transmitter 400 is coupled in series with the power line at the neutral line 402, rather than in parallel. This causes the reference value to be changed from reference ground to a reference that changes as the control signal changes. While a transmitter could transmit information in parallel across the secondary windings 404, the very low impedance of the secondary windings 404 results in a large power dissipation. By coupling the control information transmitter 400 in series with the neutral line 402, only the unbalanced current in the neutral line 402 is dissipated. In a perfectly balanced circuit, no current would exist at all. However, typical circuits are not perfectly balanced, and the unbalanced current is often in the range of 120 amps.

The control signal is consequently injected in the neutral line 402 of the power distribution line due to its in-series connection. This signal can have various peak or RMS voltage values, and in one embodiment of the invention is set to a value in the range of 20 volts to 120 volts utilizing phase modulation to generate the control signal. The signal is generated by the electronics module 406, and is passed through the protection module 408 onto the secondary windings 404 via the secondary winding power 1 line 410 and a secondary winding power 2 line 412.

The protection module 408 provides overvoltage protection for different voltage levels (i.e., different voltage thresholds) and at different speeds than the overvoltage protection provided by the high voltage protection unit 326 shown in FIG. 3. The protection module 408 provides higher speed solid-state protection to detect excessive voltages, but does so for voltages lower than the potentially very high voltages detected by the high voltage protection unit 326 of FIG. 3. For example, in one embodiment of the invention, the protection module 408 includes capacitance banks (not shown) coupled between the power 1 410 and power 2 412 lines, which can respond on the order of nanoseconds, which impedes voltage rise times by shunting voltage transients to ground. Large silicon-controlled rectifiers (SCRs) coupled between the power 1 410 and power 2 412 lines, which can respond on the order of microseconds, are used to switch voltages to ground which exceed a predetermined voltage quantity. SCRs typically refer to a three-lead device which substantially becomes a short-circuit when its gate lead is triggered by a special voltage level, and returns to an open circuit when its gate lead is returned to a low voltage. Large solid-state relays can also be used across the power 1 and power 2 lines 410, 412. High voltage protection, such as the high voltage protection unit 326 of FIG. 3, is described in greater detail in connection with FIG. 10.

The electronics module 406 generates the low-frequency control signal corresponding to the desired control function to be performed. In one embodiment of the invention, the electronics module 406 includes crossover sense circuitry 414, crossover synchronization circuit 416, signal drivers 418, 420, 422, 424, and power switching transistors 426, 428, 430, 432. The crossover sense circuit 414 detects approximately when a carrier signal, such as the power signal transmitted on the power distribution line, crosses the zero-voltage point. This circuit is used when the control signal is to be modulated onto the power signal itself, and modulating the control signal during near-zero crossover points minimizes harmonics and other noise on the line. The crossover sense circuitry 414 is described in greater detail in connection with the description corresponding to FIG. 5.

The electronics module 406 also includes crossover synchronization circuitry 416 which receives a bitstream of information from the transmit control circuit at the utility central office which corresponds to the actual information to be converted into the control signal. From this transmit control signal on line 417, the crossover synchronize block 416 manipulates the on/off operation of the power switching transistors 426, 428, 430, 432, and does so at a time dictated by the crossover sense 414 output.

Figure 5:
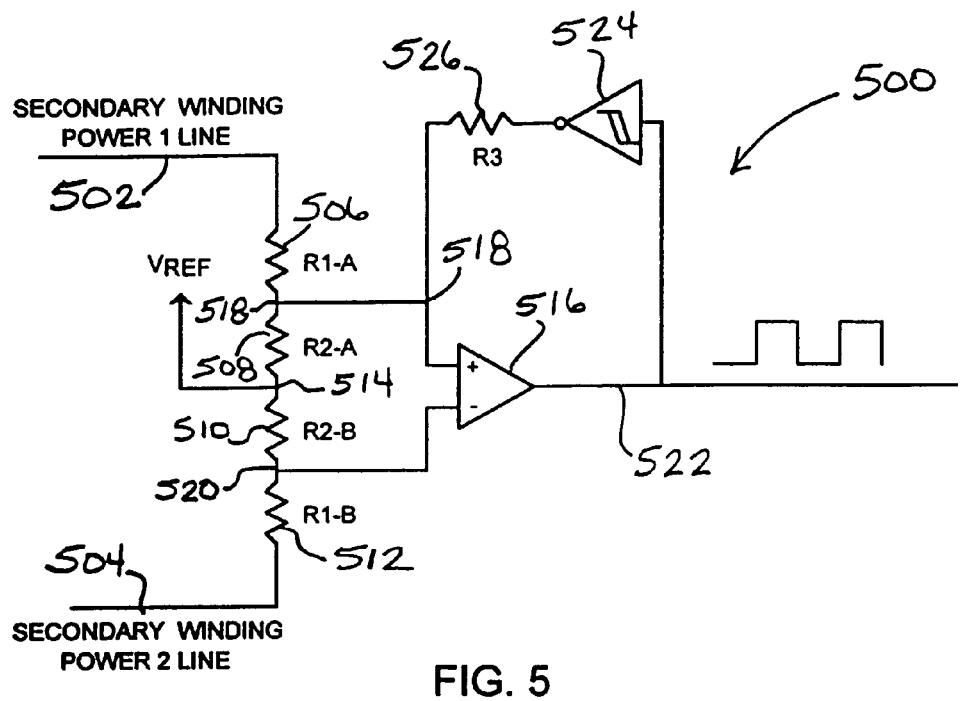
FIG. 5 is a block diagram of a zero-crossover sense circuit in accordance with one embodiment of the present invention.

FIG. 5 is a block diagram of a zero-crossover sense circuit 500 in accordance with one embodiment of the present invention. Because the control signals are transmitted on a physical transmission medium common to the transmission of the power being provided to a power consumer, it may be advantageous to use the power signal itself as a carrier wave for the control signal. In one embodiment of the invention, a low frequency control signal is modulated onto the 60 Hz power signal transmitted to the power consumer. Furthermore, the control signal is transmitted at a frequency lower than that of the power signal, because of the desirable transmission qualities of low frequency transmission. In order to effectively modulate a low frequency signal on the power signal, the present invention provides a zero-crossover sense circuit 500, which anticipates the zero-crossover point of the 60 Hz power signal, therefore providing for state transitions of the low frequency control signal at the approximate zero-crossing point. This "near zero-cross switching" minimizes harmonics and other noise on the line, so as to avoid affecting a customer's electrical devices, such as computers, phone lines, and the like.

The voltage applied to the primary windings 322 of the transformer 320 are induced onto the center-tapped secondary windings 318, as was shown in FIG. 3. This causes a secondary winding power 1 line 502 and a secondary winding power 2 line 504 of FIG. 5 to each provide a signal of equal frequency to the voltage on the primary windings. Each has a peak voltage equal to one-half of the peak primary voltage, and is 180 degrees phase-shifted from the other, due to the characteristics of the center tapped transformer. Although the invention is capable of operation at various RMS voltages and frequencies, a 120 volt RMS voltage at 60 Hz in the primary windings will be assumed for purposes of the ensuing description. Therefore, the secondary winding power 1 line 502 and the secondary winding power 2 line 504 are 60 volt RMS signals transmitted at 60 Hz.

The secondary winding power signals on lines 502 and 504 are applied across a voltage dividing circuit, which in FIG. 5 is represented by a series of resistances R1-A 506, R2-A 508, R2-B 510, and R1-B 512. In one embodiment of the invention, R1-A 506 and R1-B 512 are approximately equal to each other in resistance, and R2-A 508 and R2-B 510 are also approximately equal to each other. A reference voltage, 2.5 volts in one embodiment of the invention, is applied to node 514. The voltage dividing circuit provides a reduced voltage at the inputs of the comparing circuit, illustrated as a 2-input operational amplifier 516. For example, where R1-A 506 and R1-B 512 are each approximately 100 kilo-ohms, and R2-A 508 and R2-B 510 are each approximately 1 kilo-ohm, a voltage signal is generated at the + and − inputs of the op amp 516 which is at a voltage level capable of recognition by the op amp 516. Op amp 516 compares the input values, and provides a high logic level when the voltage at node 518 exceeds the voltage at node 520. Alternatively, op amp 516 provides a low logic level when the voltage at node 518 is lower than the voltage at node 520. Because the signals at the secondary winding power 1 and 2 lines 502 and 504 are 180 degrees out of phase, the op amp 516 will provide a high logic level for a time corresponding to 180 degrees of the 60 Hz signal, and will provide a low logic level for the time corresponding to the remaining 180 degrees of the 60 Hz signal. Therefore, a square wave on line 522 is generated having the same frequency as the primary and secondary power signals.

The generated square wave is then fed back into a schmidt-trigger inverting device 524, which has built-in hysteresis. This inverting device sources or sinks current, depending on the state of the square wave signal on line 522, through the resistance R3 526, which affects the voltage at node 518 and at the non-inverting input of the op amp 516. This results in triggering the state of the square wave signal on line 522 slightly before the zero-crossing of the 60 Hz sine wave signal. This square wave signal is then used to trigger transitions of the low frequency control signal.

It should be noted that the control signal need not be modulated onto the existing power signal. While it may be beneficial to use the power signal as a carrier because it is already available on the power distribution line, the present invention is not limited to use of the power signal as a carrier. Any time base that has long-term and short-term stability similar to the power grid may be used to generate the sub-carrier control signal. For example, the time base from global positioning system (GPS) signals could be used to generate any sub-carrier frequency desired, including a 60 Hz signal.

Figure 6:
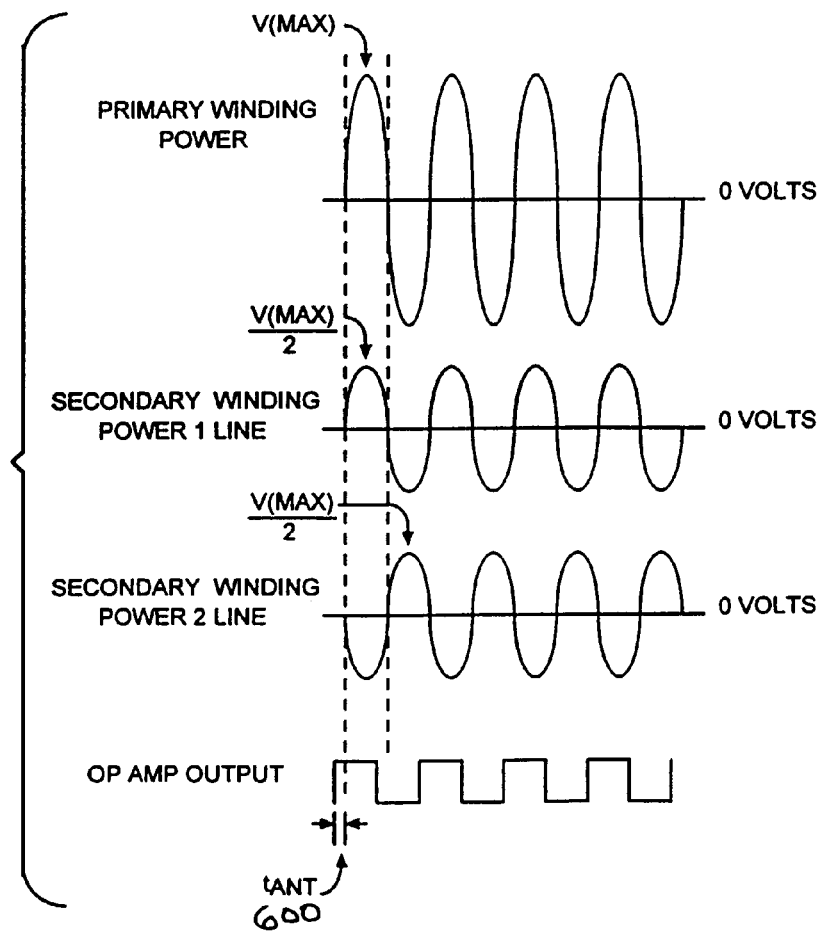
FIG. 6 is a waveform diagram illustrating the anticipation of the zero-crossover point.

Referring now to FIG. 6, a waveform diagram illustrating the anticipation of the zero-crossover point is provided. As was described in connection with FIG. 5, the primary winding power has a peak voltage of V(max), which in one embodiment of the invention is 169.7 volts for a 120 volt RMS power signal. Due to the center-tapped transformer 320, the peak voltage on the secondary winding power 1 line is V(max)/2, as is the peak voltage on the secondary winding power 2 line. However, as can be seen, the power 1 and power 2 lines are phase-shifted by 180 degrees.

The circuit of FIG. 5 provides for a square wave which is slightly shifted in time with respect to the zero-crossing point of the transformer power signal. The circuit of FIG. 5 therefore provides a square wave having a frequency substantially equal to the frequency of the transformer power signal, yet shifted by an anticipation lead time illustrated by time duration $t_{ANT}$ 600 in FIG. 6. This time duration, set to approximately 40 microseconds in one embodiment of the invention, allows time for the low frequency signal to be modulated at or very near to the zero-crossing points of the transformer power signal.

Figure 7:
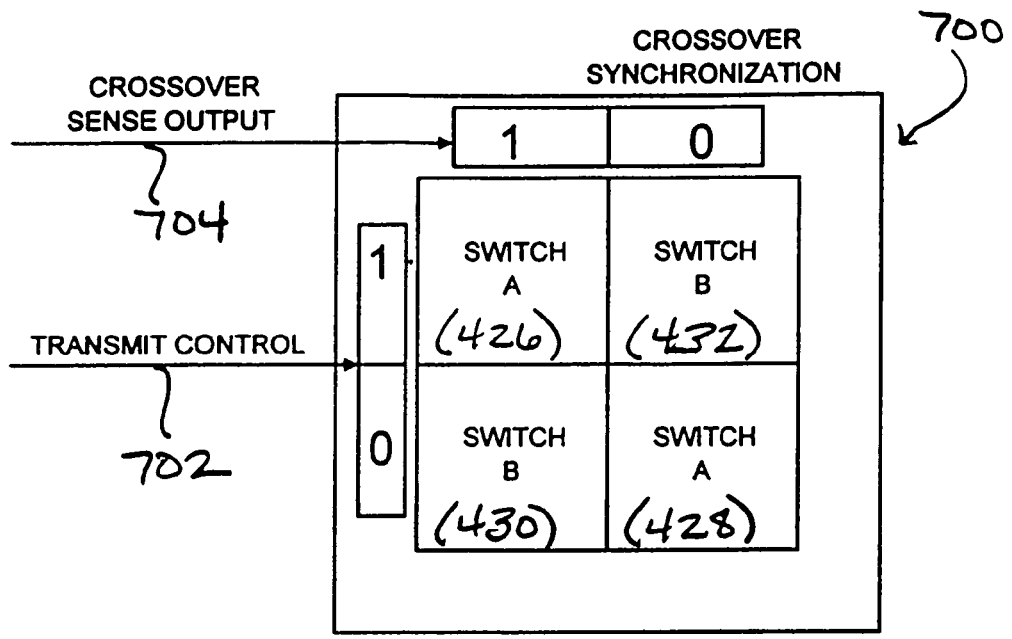
FIG. 7 is a diagram illustrating the function of the zero-crossover synchronization in accordance with one embodiment of the present invention.

FIG. 7 is a diagram illustrating zero-crossover synchronization in accordance with one embodiment of the present invention. The zero-crossover synchronization 700 receives the transmit control signal on line 702 and the crossover sense output on line 704. The crossover sense output is a square wave having a frequency substantially equal to the frequency of the transformer power signal, yet shifted by an anticipation lead time illustrated by time duration $t_{ANT}$. This signal indicates when the crossover synchronize should output a value indicative of which of the power switching transistors 426, 428, 430, 432 are to be turned on and off through drivers 418, 420, 422 and 424 respectively. For example, at a logic high (1) level of the transmit control signal on line 702, a logic high (1) level of the crossover sense output on line 704 will cause the switch 426 to turn on. The anticipation lead time of the crossover sense output allows the switch to be turned on slightly before another switch is turned off by the power signal.

Figure 8:
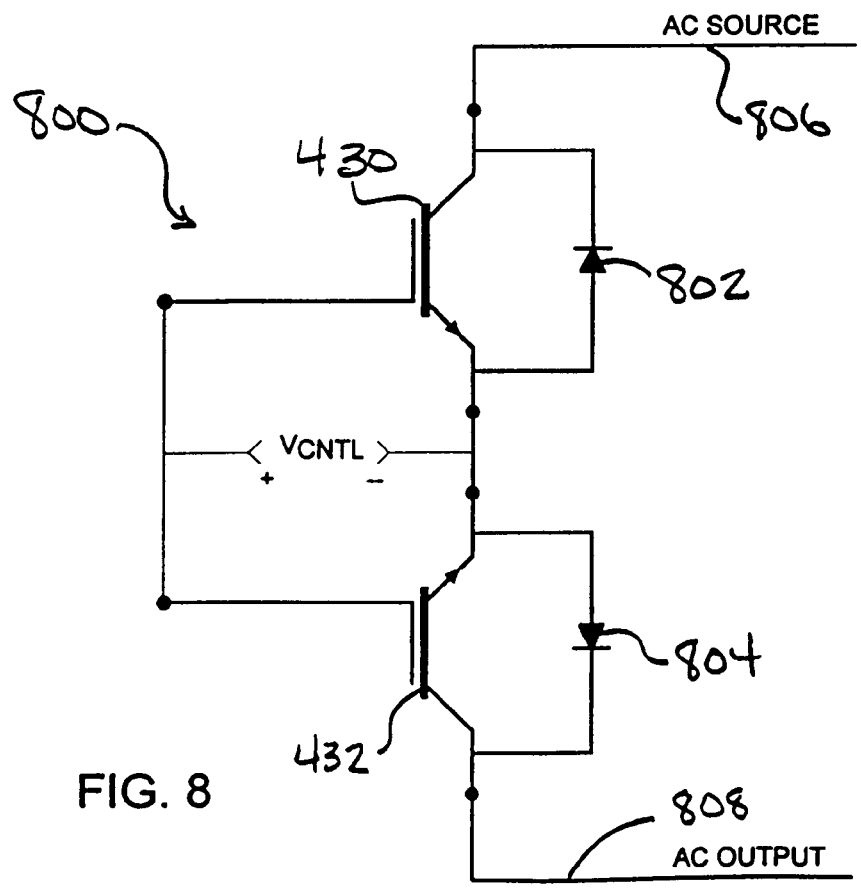
FIG. 8 is a schematic diagram of a power transistor circuit in accordance with one embodiment of the invention.

Referring now to FIG. 8, a schematic diagram of a power transistor circuit 800 in accordance with one embodiment of the invention is provided. The output power switching circuit includes four power switching transistors, shown in FIG. 7 as transistors 426, 428, 430 and 432. FIG. 8 illustrates the relationship between two of the transistors, such as transistors 430 and 432, each of which contain a diode 802, 804 that is reverse biased. When a voltage is applied to $V_{CNTL}$ with the polarity indicated, and the AC SOURCE on line 806 is on the positive half of its cycle, then transistor 430 and diode 804 will conduct in a forward-biased condition. If a voltage is applied to $V_{CNTL}$ with the polarity indicated, and the AC SOURCE is-negative with respect to the AC OUTPUT on line 808, then transistor 432 and diode 802 will conduct in a forward-biased condition. Where $V_{CNTL}$ is at 0 volts or at a slightly reverse polarity, no current will flow in this circuit. This allows half-periods of the power signal to be inverted depending on the state of the crossover synchronize circuit 416.

Figure 9:
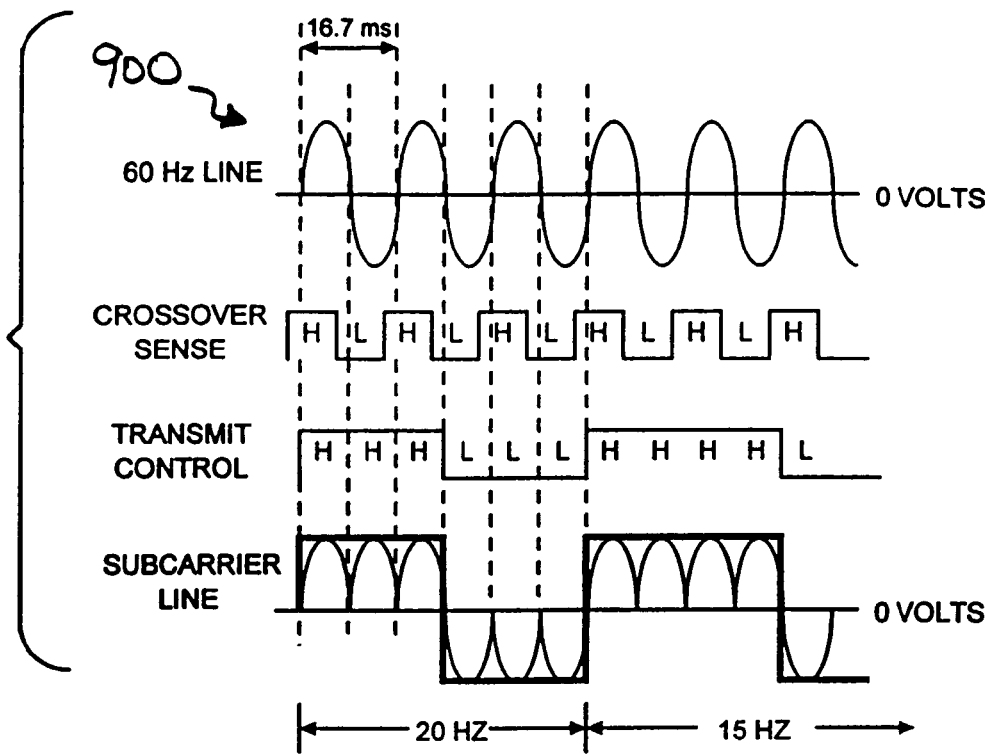
FIG. 9 is a waveform diagram illustrating one embodiment in which a low frequency control signal is derived using the frequency of the power signal as a carrier signal.

FIG. 9 is a waveform diagram illustrating one embodiment in which a low frequency control signal is derived using the frequency of the power signal as a carrier signal. The 60 Hz line represents a power transmission signal 900 on a power distribution line which can be used as a carrier for the control signal. The 60 Hz signal is a sinusoidal signal having a period of approximately 16.7 milliseconds. Because the zero-crossover point can be estimated using the crossover sense circuitry of the present invention, selected half-period waveforms can be inverted (or phase-shifted 180 degrees at the near-zero crossing). For example, the half-period waveforms 902, 904 and 906 can be inverted or phase-shifted to produce corresponding inverted half-period waveforms 908, 910 and 912 respectively. Digital signal processing can be used to provide low-pass filtering to allow only the low frequency to pass. As can be seen, an approximate square wave signal 914 having a frequency of approximately 20 Hz can be generated for the first period of the control signal by inverting the selected portions of the 60 Hz signal 900. Any frequency having a period which is an integer value of one-half of the carrier period can be generated in a similar manner. This allows the low-frequency control signal to be modulated onto a carrier having a higher frequency than the control signal.

In order to determine which half-period waveforms are to be inverted, the crossover sense output and the transmit control signal are used. As was indicated in FIG. 7, the state of these signals determines which of the power switching transistors 426, 428, 430, 432 will turn on and off, which is dictated by the crossover sense output and the transmit control signal. Referring now to FIGS. 7 and 9, it can be seen that a high logic level from the crossover sense and a high logic level from the transmit control signal cause switch 426 and 428 to turn on, which results in no inversion of the power signal. However, where a low logic level from the crossover sense and a high logic level from the transmit control occur, switches 430 and 432 turn on, thereby causing an inversion of the power signal as shown at inverted waveform 908.

In the example of FIG. 9, frequency modulation is providing the control signal, as can be seen by the variance between 20 Hz and 15 Hz. Subcarrier signals lasting for 1.5 periods of the 60 Hz signal are 20 Hz signals, and subcarrier signals lasting for 2 full periods of the 60 Hz signal are 15 Hz signals. This frequency modulation allows the control signal to be superimposed on the power signal at a lower frequency than the power signal. As will be recognized by those skilled in the art, phase modulation, or a combination of phase modulation and frequency modulation, could also be implemented in a similar manner without departing from the scope and spirit of the invention. Therefore, the exemplary embodiment described is merely illustrative, and should not be limited to a frequency modulated system.

Figure 10:
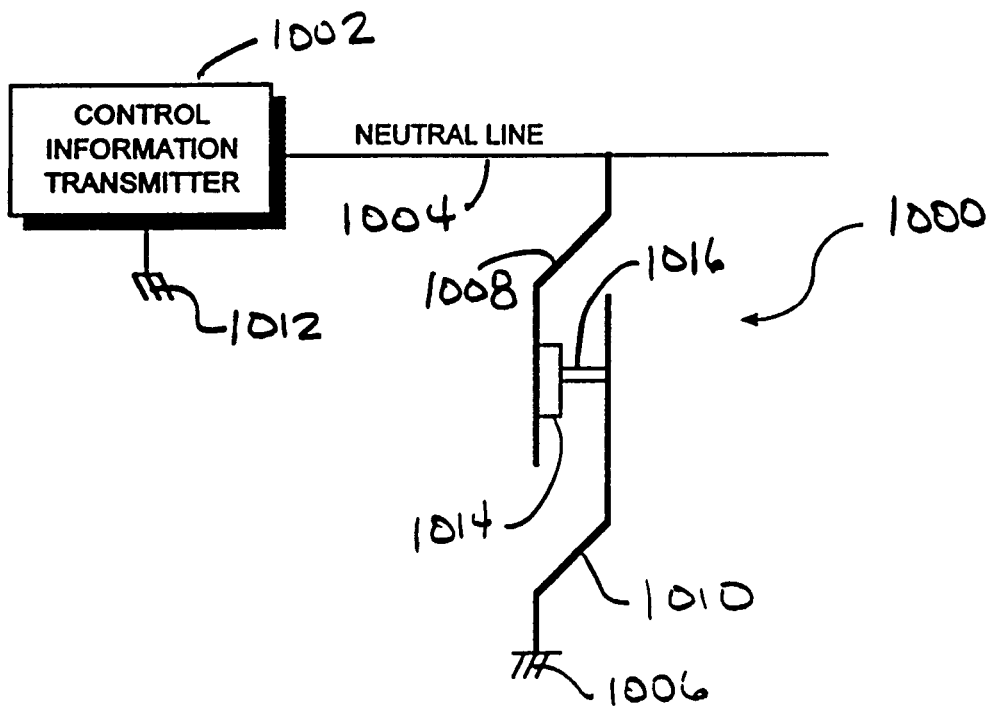
FIG. 10 is a functional illustration of one embodiment of a high voltage protection unit in accordance with the present invention.

FIG. 10 is a functional illustration of one embodiment of a high voltage protection unit 1000 in accordance with the present invention. Because the control information transmitter 1002 is connected in series with the neutral line 1004 of the power distribution line, an electrical failure of the control information transmitter 1002 may affect the power transmission itself. While a short-circuit failure of the control information transmitter 1002 to ground will not affect the power distribution (because a circuit loop for power transmission is still available), an open-circuit condition would cause the transformer reference to ground to vanish, which would result in an unacceptably high voltage to be present at the local transformer. This is a result of the in-series operation which causes both the ground reference and the secondary windings (e.g., windings 318 of FIG. 3) to be modulated. Because it is the voltage differential that is used, both the transformer windings and the ground reference may be modulated together.

In order to account for this condition, the present invention provides for substation protection modules, such as protection unit 1000. These protection modules are referred to as "anti-fuses", because where there is an open-circuit condition, they cause a short-circuit to ground, which is the opposite of what the operation of a standard "fuse" is. When the protection unit 1000 is activated upon recognition of an open-circuit condition in the control information transmitter 1002, it provides a short-circuit path from the neutral line 1004 to ground 1006, thereby maintaining a ground connection.

In one embodiment of the invention, the protection module 1000 includes two bypass conductors 1008, 1010, which are ultimately short-circuited together if the control information transmitter 1002 fails to provide a continuous connection to ground 1012. Where the control information transmitter 1002 open-circuits, the voltage on the neutral line 1004 causes a current to flow through bypass conductor 1008, through a device which has properties such that its resistance to current drops as voltage increases. In one embodiment of the invention, a metal oxide varistor (MOV) 1014 is used which utilizes the nonlinear resistance property of zinc oxide to form a variable resistor whose resistance to current drops as voltage increases. Therefore, at relatively low voltages, the MOV has non-conductive insulating characteristics, while at high voltages the MOV conducts current.

The current from the neutral line 1004 passes through the MOV 1014, through a conducting device 1016 which is used to separate the bypass conductors 1008, 1010 under normal circumstances, and back through the bypass conductor 1010. In one embodiment of the invention, the conducting device 1016 is a solder joint which holds the bypass conductors 1008, 1010 apart until the current through the MOV 1014 is high enough to melt the solder joint, thereby causing the tensioned bypass conductors 1008, 1010 to snap together and provide a high current path for the current to flow to ground 1006.

In summary, the protection unit 1000 provides a high-current path to ground when the control information transmitter 1002 fails in an open-circuit mode. As will be readily apparent to those skilled in the art from the description of the protection unit 1000, various other components other than MOVs, solder joints, and the like can be similarly used to generate the "anti-fuse" function, as the protection unit 1000 of the present invention is not limited to such. It will also be readily apparent to those skilled in the art that the device 1014 and the conducting device 1016 can be calibrated such that the bypass conductors 1008, 1010 are coupled together at a desired voltage on the neutral line 1004 through the selection of appropriate resistance values. Further, the precise mechanical configuration utilized is irrelevant, however the physical and electrical properties of the bypass conductors 1008, 1010 must be selected such that they can adequately carry the large currents that they will conduct.

Figure 11:
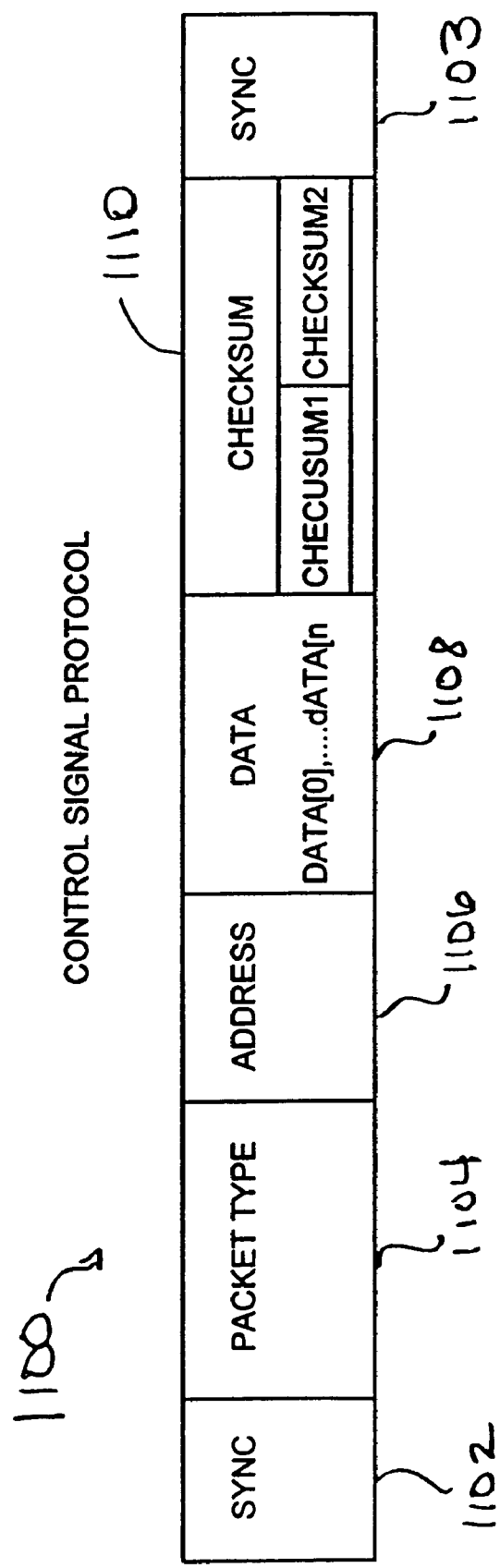
FIG. 11 is a diagram illustrating one embodiment of the control signal protocol of the present invention.

FIG. 11 is a diagram illustrating one embodiment of the control signal protocol 1100 of the present invention. The sync fields 1102, 1103 are frame synchronization fields. In one embodiment of the invention, sync field 1102 is a predetermined number of continuous binary "1" values. Each byte is sent least significant bit first, with one start bit and no stop bits. The packet type field 1104 indicates the length of the address is if there is an address associated with the information, and what the contents of the information are. Although the exact binary value corresponding to particular information may vary, one embodiment of the invention utilizes binary codes to indicate the address and information content as shown in Table 1 below:

TABLE 1

| Types 0–3 | 0000 | Time |
|---|---|---|
| Broadcast | 0001 | Close |
| (no address) | 0010 | Data |
| | 0011 | Options |
| Types 4–7 | 0100 | Time |
| Group Address | 0101 | Open |
| (8-bit address) | 0110 | Data |
| | 0111 | Options |
| Types 8-B | 1000 | Time |
| Serial Number Address | 1001 | Open |
| (32-bit address) | 1010 | Data |
| | 1011 | Options |
| Types C–F | 1100 | Time |
| F Serial Number Range | 1101 | Open |
| (2 32-bit addresses) | 1110 | Data |
| | 1111 | Options |
| | 0x10 | File Name and Header |
| | 0x11-0xEF | File Data |
| | 0xF0-0xFF | Reserved |

The packet type corresponding to "time" provides the time and temperature, and may be transmitted such that the end of the stop bit is exactly at the top of the minute. In one embodiment of the invention, the temperature is a signed byte with 0.5 C. degree steps, and the time is defined in two bytes. In a first byte, bits (0–5) correspond to 0–59 minutes, bit (6) corresponds to the state of a DST (daylight savings time) flag to indicate whether the end device is in daylight savings time, and bit (7) is for a special schedule flag which is used for holidays or other special daily schedules. A second byte uses bits (0–4) to represent hours 0–23, a GMT (Greenwich Mean Time) flag to indicate whether the end device corresponds to GMT, a timezone offset flag to indicate whether a timezone offset has been applied to the end device time, and a second DST flag to indicate whether the end device includes a daylight savings time adjustment. These times and schedules allow for control of particular customer devices at particular times, and accounts for special circumstances due to holidays and other special events.

The packet type corresponding to "time" also includes the date, which, in one embodiment, includes 3 bytes of information. A first byte uses bits (0–4) to indicate the day of the month, and bits (5–7) to indicate the day of the week. A second byte uses bits (0–3) to indicate the month, and bits (4–7) to indicate the "season" (which can be defined), or a special schedule. A third byte uses bits (0–6) to indicate the binary year from 0–99, and bit (7) is reserved.

The packet type corresponding to "open" is a command to select multiple end units, and "close" causes all units to be deselected. The "data" packet type corresponds to general data to be passed on to the unit. The "options" type can be used for various options, including bit rates, bandwidth and frequency.

Referring again to FIG. 11, the address field 1106 can include information ranging from no bits to 2 32-bit values. For a broadcast message (i.e., sent to all end devices), no address needs to be provided. For a Group Address, an 8-bit address denotes an address of a particular group. Serial number addresses may be 1 or 2 32-bit addresses, which addresses end units by serial number. The data field 1108 provides any data to be sent, and the checksum fields 1110 up to two different checksum values calculated in two different ways.

While the foregoing protocol is used in one embodiment of the invention, it is provided for illustrative purposes only. Various fields and binary value representations can be modified without departing from the scope and spirit of the invention, as will be readily recognized by those skilled in the art. Therefore, the foregoing is merely illustrative, and the invention is not to be limited to a protocol as provided in connection with FIG. 11 above.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A full-duplex communications system for transmitting information, comprising:
　an electric power distribution line to transmit an electrical power signal;
　a power distribution circuit coupled to the electric power distribution line to provide the electrical power signal to a power consumer via the electric power distribution line, the electric power signal being transformed to a voltage level useable by the power consumer by a transformer;
　a first information transmitter coupled to the power distribution circuit to provide first information signals concurrently with the electric power signal to the power consumer via the electric power distribution line, the first information signals passing through the transformer, the first information transmitter comprising,
　　a first carrier frequency signal generator configured to generate a first carrier frequency signal using a first stable input signal from at least one of the following: the electric power signal, a satellite clock signal, an atomic clock signal, and an internally mounted circuit,
　　a first signal inversion circuit configured to invert every other half-period of the first carrier frequency signal, and
　　a first signal generator circuit configured to modulate the first information signals onto the electrical power distribution line using the first carrier frequency signal;
　a first information receiver, coupled to a power consumer device powered by the electrical power signal, to receive the first information signals via the electric power distribution line;
　a second information transmitter coupled to the power consumer device to provide second information signals concurrently with the electrical power signal via the electric power distribution line, the second information signals passing through the transformer, the second information transmitter comprising,
　　a second carrier frequency signal generator configured to generate a second carrier frequency signal using a second stable input signal from at least one of the following: the electric power signal, the satellite clock signal, the atomic clock signal, and the internally mounted circuit;
　　a second signal inversion circuit configured to invert every other half-period of the second carrier frequency signal, and a second signal generator circuit configured to modulate the second information signals onto the electrical power distribution line using the second carrier frequency signal; and a second information receiver coupled to the power distribution circuit to receive the second information signals via the electric power distribution line, whereby full-duplex communication between the power distribution circuit and the power consumer is accomplished via the electric power distribution line.

2. The system of claim 1, wherein the satellite clock signal is received from a global positioning system.

3. The system of claim 1, wherein the internally mounted circuit uses a frequency locked loop system.

4. The system of claim 1, wherein the internally mounted circuit uses a phase locked loop system.

5. The system of claim 1, wherein the first information signals are configured to control a device.

6. The system of claim 1, wherein the first signal generator circuit is configured to modulate the first information signals at a frequency that is an integer value of one-half the period of the first carrier frequency.

7. The system of claim 1, wherein the second signal generator circuit is configured to modulate the second information signals at a frequency that is an integer value of one-half the period of the second carrier frequency.

8. The system of claim 1, wherein the first signal generator circuit is configured to modulate using one of the following: a frequency modulation, an amplitude modulation, a phase modulation, and a combination of frequency and phase modulation.

9. The system of claim 1, wherein the second signal generator circuit is configured to modulate using one of the following: a frequency modulation, an amplitude modulation, a phase modulation, and a combination of frequency and phase modulation.

10. The system of claim 1, wherein the first information receiver comprises a first digital signal processor configured to provide at least one of the following: demodulation and filtering.

11. The system of claim 1, wherein the second information receiver comprises a second digital signal processor configured to provide at least one of the following: demodulation and filtering.

12. The system of claim 1, wherein the first information transmitter further comprises a first zero cross-over sensing circuit to anticipate the zero cross-over of the electric power signal.

13. The system of claim 1, wherein the second information transmitter further comprises a second zero cross-over sensing circuit to anticipate the zero cross-over of the electric power signal.

14. The system of claim 1, wherein the first information transmitter further comprises a first phase-shifting circuit to shift a phase of every half-period of the carrier frequency signal.

15. A full-duplex communications system for transmitting information, comprising:
an electric power distribution line to transmit an electrical power signal;
a power distribution circuit coupled to the electric power distribution line to provide the electrical power signal to a power consumer via the electric power distribution line, the electric power signal being transformed to a voltage level useable by the power consumer by a transformer;

a first information transmitter coupled in series with a neutral connection of the power distribution circuit to provide first information signals concurrently with the electric power signal to the power consumer via the electric power distribution line, the first information signals passing through the transformer, the first information transmitter comprising,
  a first carrier frequency signal generator configured to generate a first carrier frequency signal using a first stable input signal from at least one of the following: the electric power signal, a satellite clock signal, an atomic clock signal, and an internally mounted circuit,
  a first signal inversion circuit configured to invert every other half-period of the first carrier frequency signal, and
  a first signal generator circuit configured to modulate the first information signals onto the electrical power distribution line using the first carrier frequency signal;

at least one protection module coupled between the neutral connection of the power distribution circuit and the first information transmitter, wherein the protection module having a ground connection can recognize an open-circuit between the neutral connection of the power distribution circuit and the first information transmitter, and ground the neutral connection of the power distribution circuit;

a first information receiver, coupled to a power consumer device powered by the electrical power signal, to receive the first information signals via the electric power distribution line;

a second information transmitter coupled to the power consumer device to provide a second information signal concurrently with the electrical power signal via the electric power distribution line, the second information signals passing through the transformer, the second information transmitter comprising,
  a second carrier frequency signal generator configured to generate a second carrier frequency signal using a second stable input signal from at least one of the following: the electric power signal, the satellite clock signal, the atomic clock signal, and the internally mounted circuit,
  a second signal inversion circuit configured to invert every other half-period of the second carrier frequency signal, and
  a second signal generator circuit configured to modulate the second information signals onto the electrical power distribution line using the second carrier frequency signal; and a second information receiver coupled to the power distribution circuit to receive the second information signals via the electric power distribution line, whereby full duplex communication between the power distribution circuit and the power consumer is accomplished via the electric power distribution line.

16. The system of claim 15, wherein the at least one protection module is configured to carry at least a maximum current capable of being carried on the neutral connection of the electric power distribution line.

17. The system of claim 15, wherein the at least one protection module comprises:
a conductive restraining device coupled between the neutral connection of the power distribution circuit and the ground connection, the conductive restraining device being open and separating the neutral connection of the power distribution circuit and the ground connection until a voltage at the neutral connection is sufficiently high to pass a current through a voltage threshold device causing the conductive restraining device to close; and the voltage threshold device having properties such that the voltage threshold device's resistance changes as the voltage at the neutral connection changes according to at least one of the following: the voltage threshold device's resistance diminishing at a faster rate than the voltage change at the neutral connection, the voltage threshold device's resistance diminishing at a same rate than the voltage change at the neutral connection, the voltage threshold device's resistance diminishing non-linear to the voltage change at the neutral connection, and a switched grounding device, switching the ground connection to a shorted connection at a maximum threshold voltage and to an open connection at a minimum threshold voltage.

18. The system of claim 15, wherein the first signal generator circuit is configured to modulate using one of the following: a frequency modulation, an amplitude modulation, a phase modulation, and a combination of frequency and phase modulation.

19. The system of claim 15, wherein the first information receiver comprises a first digital signal processor to provide at least one of the following: demodulation and filtering.

20. A communication method for communicating between an electric power provider and an electric power consumer using an electric power distribution line comprising:

providing an electric power signal to the electric power consumer through an electric power distribution circuit, the electric power signal being transformed to a voltage level useable by the electric power consumer by a transformer;

transmitting a first full-duplex communications signal through the electric power distribution circuit concurrently with the electric power signal using a first signal transmitter, the first signal transmitter coupled to the electric power distribution circuit, the first signal transmitter comprising, a first signal inversion circuit configured to invert every nth half-period of a carrier frequency signal, and a first signal generator circuit configured to modulate the first full-duplex communications signal onto the electric power distribution circuit, the first signal generator comprising a carrier frequency signal generator circuit configured to generate the carrier frequency signal using a first stable input signal from at least one of the following: the electric power signal, a satellite clock signal, an atomic clock signal, and an internal circuit;

receiving the first full-duplex communications signal through the electric power distribution circuit using a first signal receiver, the first signal receiver coupled to the electric power distribution circuit, transmitting a second full-duplex communications signal through the electric power distribution circuit concurrently with the electric power signal using a second signal transmitter, the second signal transmitter coupled with the electric power distribution circuit, the second signal transmitter comprising, a second signal inversion circuit configured to invert every nth half-period of the carrier frequency signal, and a second signal generator circuit configured to modulate the second full-duplex communications signal onto the electric power distribution circuit, the second signal generator comprising a second carrier frequency signal generator configured to generate the carrier frequency signal using a second stable input signal from at least one of the following: the electric power signal, the satellite clock signal, the atomic clock signal, and the internal circuit; and receiving the second full-duplex communications signal through the electric power distribution circuit using a second signal receiver, the second signal receiver coupled to the electric power distribution circuit.

* * * * *